United States Patent [19]
Gibb

[11] Patent Number: 5,930,766
[45] Date of Patent: Jul. 27, 1999

[54] COMPUTERIZED SYSTEM FOR MAINTAINING BAR ARTICLES STORED ON SHELVES

[75] Inventor: David Gibb, Perivale, United Kingdom

[73] Assignee: Minibar Production Limited, Middlesex, United Kingdom

[21] Appl. No.: 08/725,315

[22] Filed: Oct. 2, 1996

[51] Int. Cl.⁶ ...................................................... B67D 5/10
[52] U.S. Cl. .............................. 705/15; 705/22; 705/28; 364/479.09; 235/381
[58] Field of Search ................................ 705/15, 128.22, 705/34; 235/381, 385; 364/479.09; 177/25.19; 108/50; 186/44

[56] References Cited

U.S. PATENT DOCUMENTS

| | | | |
|---|---|---|---|
| 4,961,533 | 10/1990 | Teller et al. | 177/25.19 |
| 4,981,755 | 1/1991 | Asher | 428/317.3 |
| 5,163,536 | 11/1992 | Tuhro et al. | 186/44 |
| 5,671,362 | 9/1997 | Cowe et al. | 705/28 |
| 5,694,862 | 12/1997 | Grubb | 108/50 |
| 5,728,999 | 3/1998 | Teicher | 235/381 |
| 5,731,981 | 3/1998 | Simard | 364/479.09 |

FOREIGN PATENT DOCUMENTS

| | | |
|---|---|---|
| 1536532 | 12/1978 | United Kingdom . |
| 2116763 | 9/1983 | United Kingdom . |
| 2135292 | 8/1984 | United Kingdom . |
| 2204417 | 11/1988 | United Kingdom . |

*Primary Examiner*—Allen R. MacDonald
*Assistant Examiner*—M. Irshadullah
*Attorney, Agent, or Firm*—Nixon & Vanderhye P.C.

[57] ABSTRACT

An open shelf bar arrangement for an hotel or like establishment comprises a plurality of open shelf bars (3), each having shelf units (23) for receiving articles (45) and control arrangements for determining the presence or absence of articles and transmitting data thereabout. A central processor (5) is provided for receiving data from the bar control arrangement of each bar (3) and for controlling the bars, the central processor (5) providing data to reporting means (11) for providing reports on the operation of the bars (3) and to a central billing arrangement (9) for adding the cost of items taken from the bars to appropriate customers billing. The invention also includes the bar control arrangement and the bar shelf units (23).

23 Claims, 6 Drawing Sheets

COMPUTERIZED SYSTEM FOR MAINTAINING BAR ARTICLES STORED ON SHELVES

BACKGROUND OF THE INVENTION

1. Field of the Invention

This invention relates to an open shelf bar.

2. Discussion of the Prior Art

In the hotel business many rooms are equipped with bars which enable the occupant to have a drink in his or her room. There have been many types of bar provided for individual use in rooms and these range from the very basic system in which the room occupier takes articles from the bar and lists them on a form provided which he then takes down to the reception where the articles consumed are added to his bill to more sophisticated arrangements where the articles are kept in individual compartments holes and a sensor is used associated, for example, with the door to the compartment which indicates when an article has been taken out. This information is then fed to the bill producing station when the article is automatically added to the customer's bill.

Current systems have a number of disadvantages. For example, with the basic type, the customer may not record his usages properly or at all, where the discrepancy only comes to light after the customer has left the hotel with consequent loss to the hotel owners. In the more sophisticated systems, there is no open access and consequently the customer may be deterred from buying an article which he cannot readily inspect. Free access is also available to the hotel staff.

SUMMARY OF THE INVENTION

The present invention seeks to provide a sophisticated system which provides open access to articles in the bar so that they can be inspected before purchase and which provides adequate safeguards for the hotel and minimum difficulty in purchase by the customer.

According to a first aspect of the invention, there is provided a bar control arrangement for an open shelf bar comprising a plurality of shelf units having a plurality of locations for articles in the bar, a sensor for each location for determining the present or absence of an article at the said location, activating means for each shelf for sequentially activating the sensors and a controller having drive means for activating the activating means for each shelf, receiving means for receiving signals from the sensors for the activated shelf, means for processing the signals received from the sensors into a suitable form for onward transmission of data and input and output means communicating with a central processor.

The individual shelf units may all be activated at the same time or may be activated sequentially.

The activation of the shelf units may be continuous, i.e. once one cycle of activation has been completed a new cycle is started automatically.

The controller may have storage means for retaining the data until interrogated. Means may be provided for sending a simple signal from the controller when there has been no change in the bar status since the last interrogation.

According to a second aspect of the invention, there is provided a shelf unit for an open shelf bar comprising an upper surface for receiving articles for storage in the bar, location means for locating the articles in positions on the upper surface of the shelf and sensing means located beneath the upper surface of the shelf at each of said locations for sensing the presence or absence of articles on said locations, the upper surface being transparent at least at positions above the sensors, and the sensors comprising an optical transmitter and an optical receiver so located that rays from the transmitter are reflected from an article, if present at the associated location, back to the receiver.

Preferably the locations comprise shallow dished portions of the upper surface.

Two or more receivers may be associated with each transmitter such that at least one of the receivers receives the ray from the transmitter when an article is present at the associated location.

Preferably the transmitter is an infrared transmitter and the receiver is an infrared receiver.

The sensors may be mounted on a circuit board located beneath the upper surface and the circuit board may also incorporate drive means for driving the transmitters.

Suitably the drive means may have means for firing the transmitters in sequence so that signals from the receivers will also be present in the same sequence.

The drive means may be triggered by a single input line and the outputs of the receivers may be combined into a single output line.

According to a third aspect of the invention, an open shelf bar arrangement for an hotel or like establishment comprises a plurality of open shelf bars having shelf units according to the second aspect of the invention and control arrangements in accordance with the first aspect of the invention, a central processor providing data to reporting means for providing reports on the bar's operation and to a central billing arrangement for adding items taken from the bars to appropriate customers billing. Suitably the connection between the central processor and the bar controllers takes place over a radio frequency channel. The radio frequency channel may be the aerial system of the hotel. Alternatively a twisted pair communication cable system can be used.

BRIEF DESCRIPTION OF THE DRAWINGS

The invention will now be described in greater detail, by way of example, with reference to the drawings, in which.

DETAILED DISCUSSION OF PREFERRED EMBODIMENTS

Figure 1:
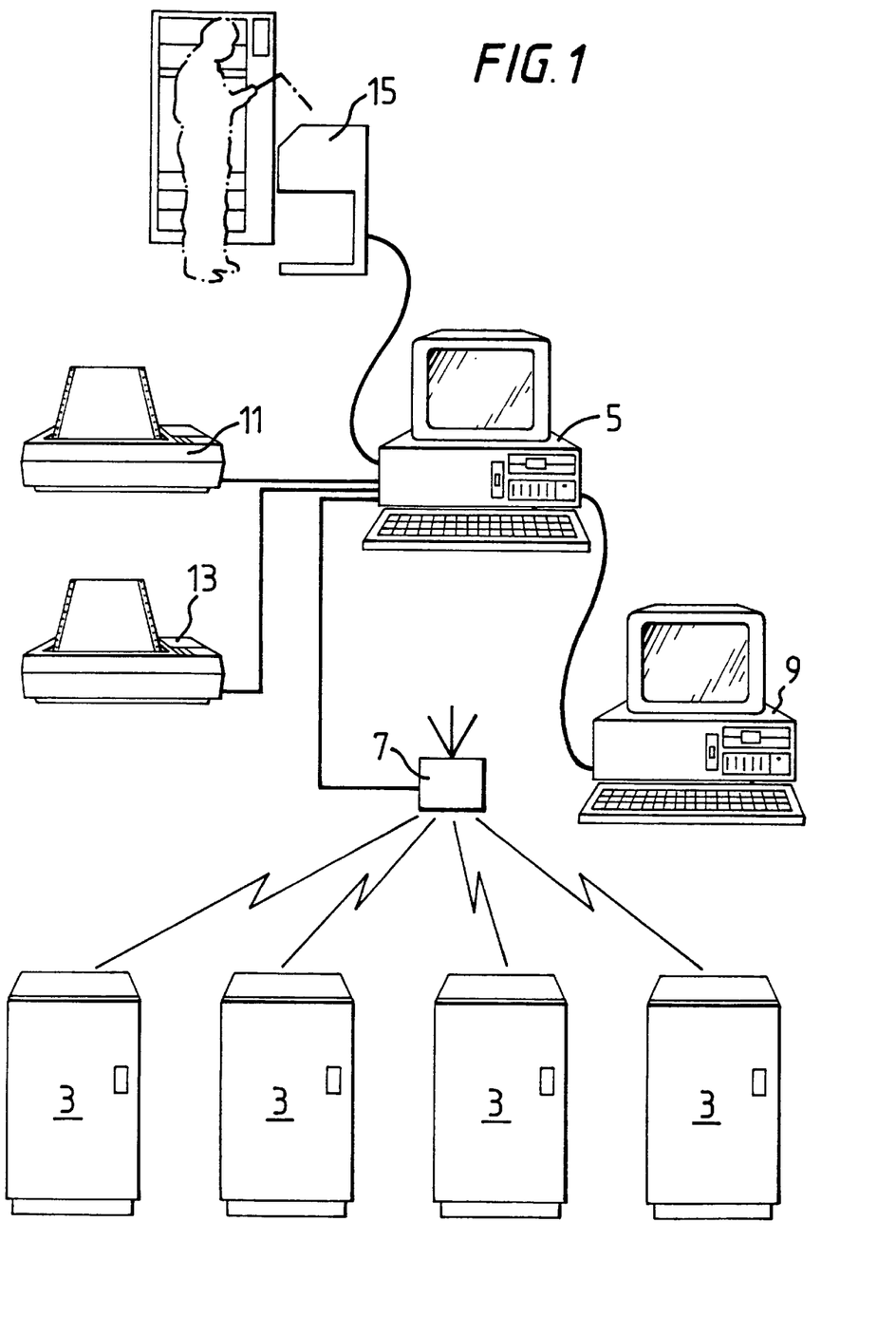
FIG. 1 is a diagrammatic representation of a complete bar system for an hotel.

Referring firstly to FIG. 1, there is shown diagrammatically a hotel installation of open shelf bars. Each room of the hotel is fitted individually with a bar 3. Four are shown in the diagram but there may be any suitable number of bars, up to 4,000.

The bars 3 are connected to a central processor 5 by means of the aerial system 7 of the hotel. This avoids the need for any extra wiring since the aerial system is already in place. The central processor 5 controls the system and is connected to various ancillary devices such as the hotel billing system 9, a report printer 11 and an audit printer 13. It can also be connected to a remote support arrangement 15 which can be used to provide any adjustments required to the central processor 5.

The system operates as follows:

Each bar comprises a refrigerated cabinet containing a number of shelves, each shelf having a number of individual locations on which articles for sale are placed. Sensors located under the shelf surface detect the presence or absence of the articles. Each bar has a bar controller which fires the sensors in rotation and collects information as to the status of the articles in the bar, absence of an article indicating that the article has been sold.

The central processor 5 communicates with each bar controller in turn and collects the status information from it. It then stores and passes this information to the hotel billing system 9 for addition to the customer's bill.

Additional information to article status information can also be supplied by the bar controller. This includes the status of a door lock providing information as to the opening or closing of the bar door. It may also provide temperature information as to the temperature of the bar. The bar controller also controls the locking or unlocking of the door to allow access to the bar on the instructions of the central processor.

The central processor 5 has a number of functions, the major ones of which are:

i) to receive and store information provided by the bar controllers, ii) to provide billing information to the hotel billing system.

iii) to control the operation of the bar door locks.

iv) to monitor the correct operation of the bar and to control the bar refrigeration system if necessary.

v) to provide reports on all aspects of the operation and diagnostics including status reports on the articles in the bar, use of the bar etc.

Figure 2:
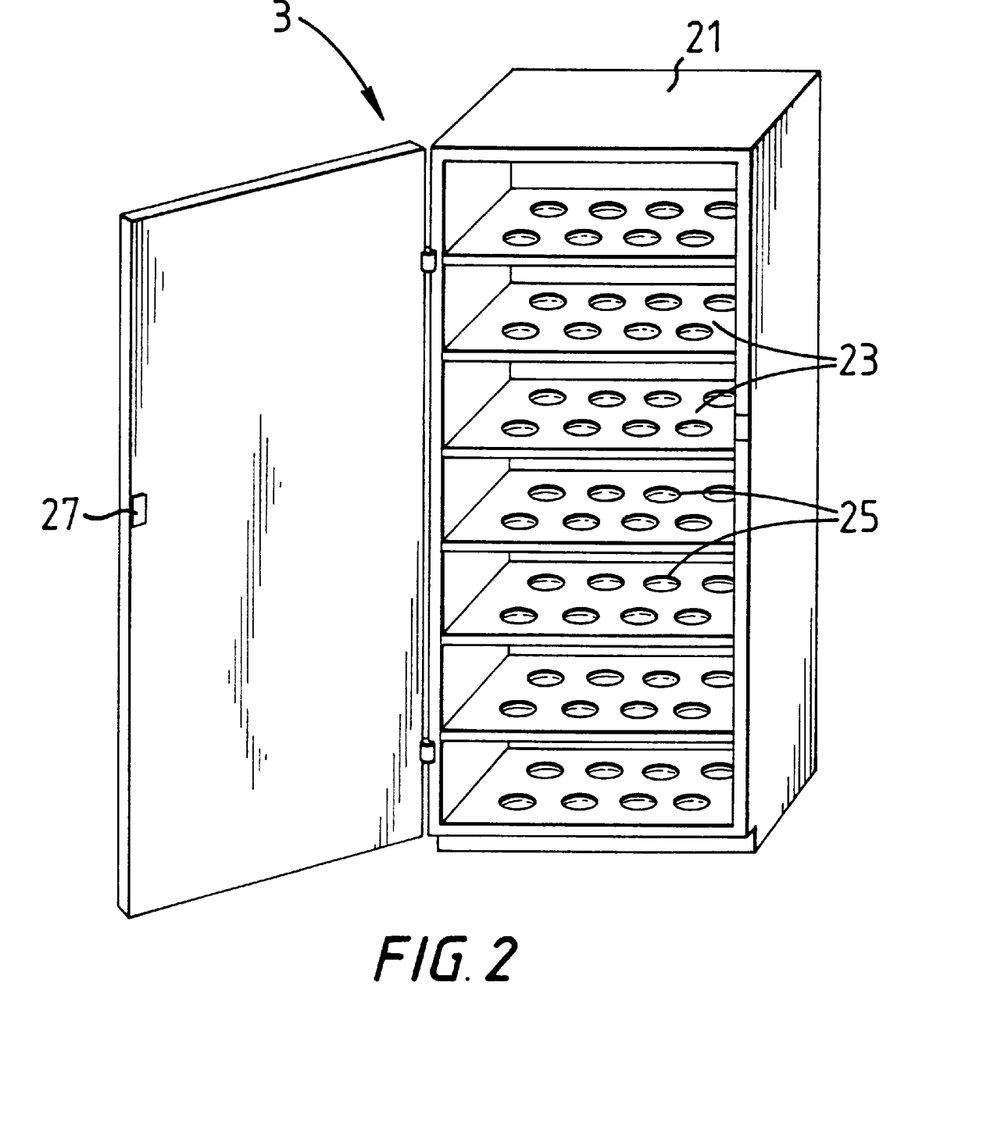
FIG. 2 is a schematic view of a bar unit with the door open.

FIG. 2 shows a suitable form of bar 3 for use with arrangement. To this end, the bar 3 comprises a refrigerated cabinet 21 having a number of shelves 23 for containing articles to be sold. The bar shown has seven shelves 23, each having locations 25 for eight articles making a total of fifty six articles for each bar. It will be understood that within the confines of a bar situation, the articles may range from bottles of wine and miniature spirits at one end to cans and cartons of soft drinks and snack items at the other end.

Suitably, as shown, the article locations 25 are shallow indentations in the shelf 23. These do not need to follow the shape of the article concerned making special locations unnecessary and enabling changes in the stocking arrangements of the bar possible without any change in the construction of a bar. The shelves 23 are provided with sensors related to the individual locations and these sensors will be associated with a bar controller which additionally has other functions as will be described hereafter.

The bar is equipped with a door lock 27 controller by the central processor. This door lock 27 will also be provided with a sensor which senses the operation of the lock and may also, separately sense when the door is open. Temperature controls and sensors, not shown, are also provided.

It will be appreciated that the above described bar unit is of a basic design and this may be modified to suit different applications. For example, the bar may be divided into two compartments, one compartment being refrigerated and the other compartment being at ambient temperature. This allows for a wider range of goods to be available. The door of the bar may itself be provided with shelves for further articles, these shelves being of the same type as the shelves 23 but usually of a different configuration of locations. Suitably these would be a single row of locations.

In a further extension of the bar principle, it is possible to provide additional shelves remote from the bar itself, for example, built into other furniture, the shelves working on the same principle as those in the bar. These additional remote shelves being wired in to the bar controller.

Figure 4:
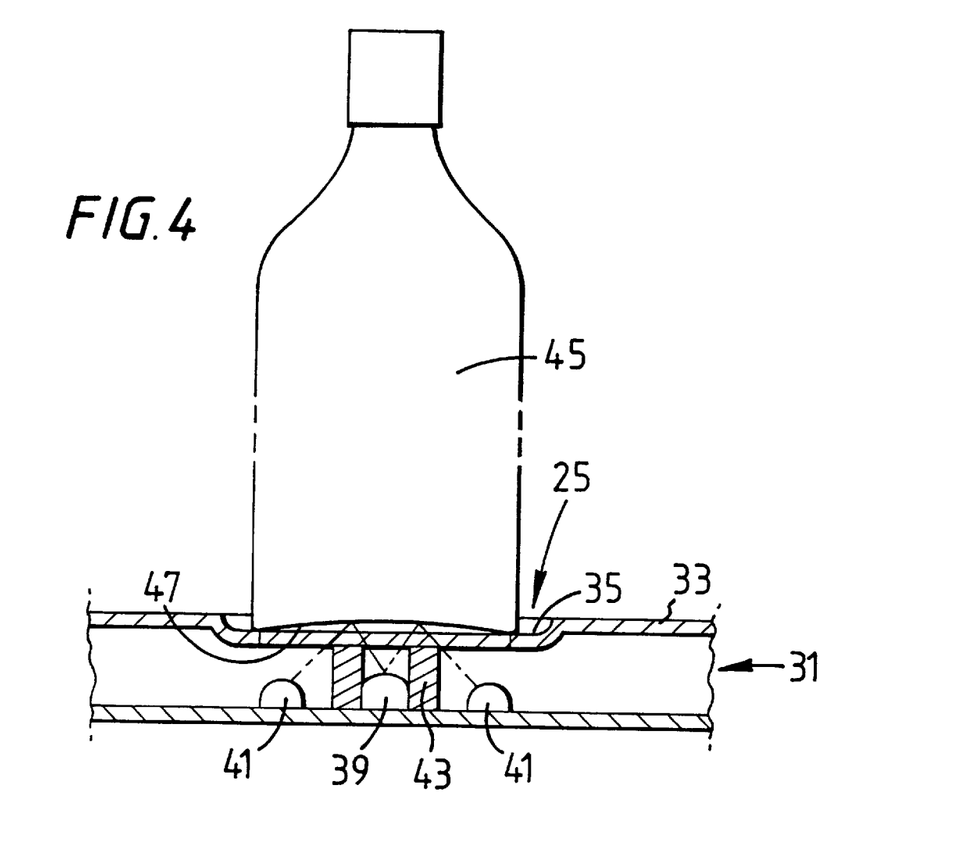
FIG. 4 is a diagrammatic side elevational view of the sensor device used.
Figure 5:
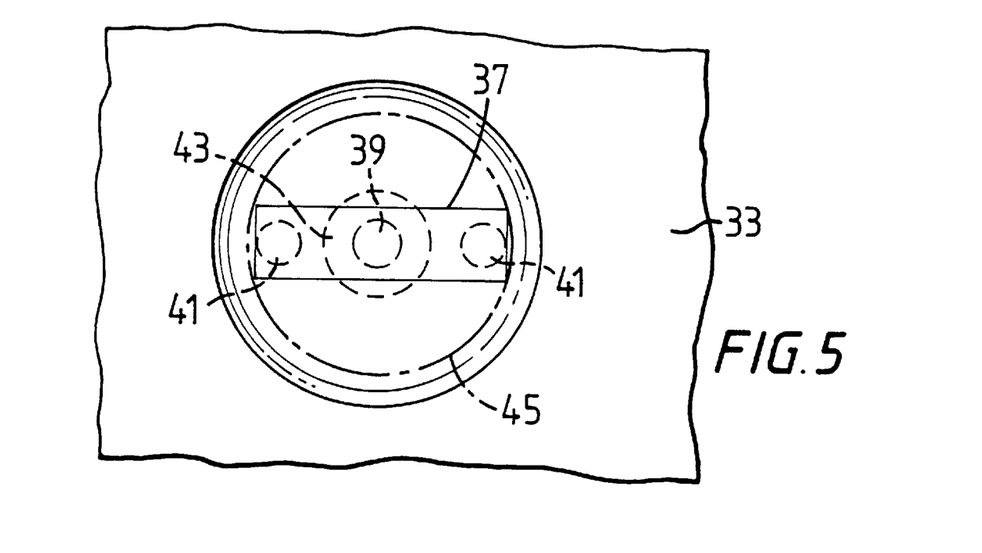
FIG. 5 is a plan view of the sensor device shown in FIG. 5.

The sensing device for the individual articles is shown in FIGS. 4 and 5. Here a section of the shelf is shown at 31. It consists of an upper surface 33 having indentations therein, one of which is shown at 35 forming a location 25. At least a part 37 of this indentation 35 is transparent for a reason to be explained. Situated underneath the indentations 35 there is an infrared transmitter 39 located roughly in the centre of the indentation 35 and is flanked on two opposite sides, located 180 degrees apart by two infrared receivers 41. The transmitter 39 has a shroud 43 positioned therearound to ensure that it transmits rays substantially upwardly through the transparent portion 37 of the shelf surface 33 so as to ensure that there is no possible direct path for the transmitted rays between the transmitter 39 and one or both of the receivers 41.

An article to be sensed is shown as a bottle 45 and is located in the indentation 35. As can be seen, rays from the transmitter 39 hit the bottom 47 of the bottle 45 and are reflected back from the bottle so as to hit one or both of the receivers 41. It has been found that, with a suitable spacing of the receivers 41 from the transmitter 39, most articles can be detected. It is envisaged that in some applications, where the articles to be sensed are of the same or similar type, only one receiver may be necessary. Furthermore, to increase the sensing ability of the sensor, three or even more receivers could be used. It will be appreciated that on firing of the transmitter 39, one or more of the receivers 41 will send out a data signal when an article is present and will send out no signal when the article is absent. These signals will be sent to a microprocessor in the bar controller (to be described in relation to FIG. 7).

In order to avoid problems either from extraneous infrared reflections or the possible effects of ambient light, the transparency of the shelf top may be limited to certain areas, suitably by use of a mask. Preferably the mask is in the form of a rectangular aperture extending from one receiver 41 to the other across the transmitter 39.

Figure 3:
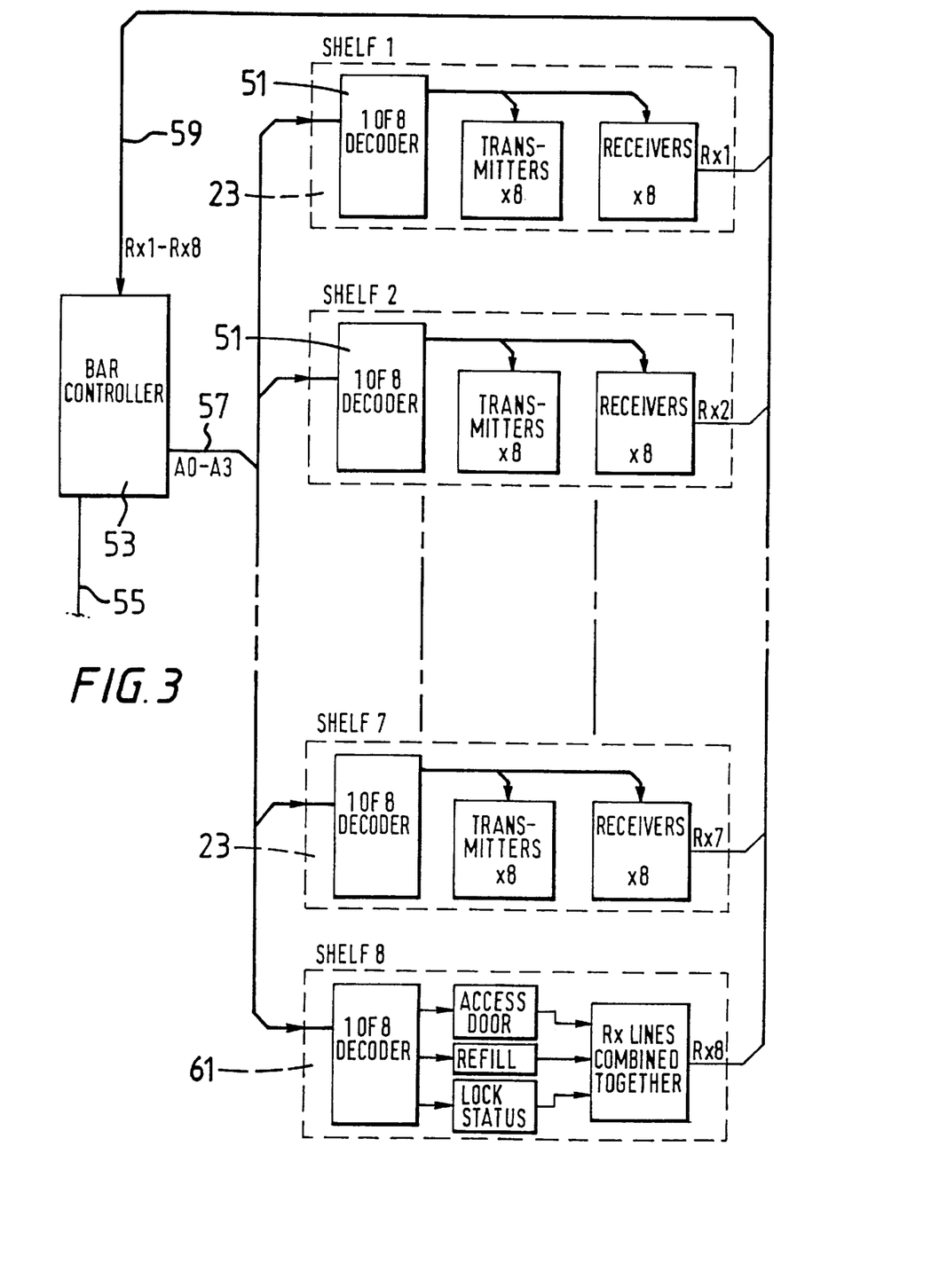
FIG. 3 is a block diagram of a bar circuit.
Figure 6:
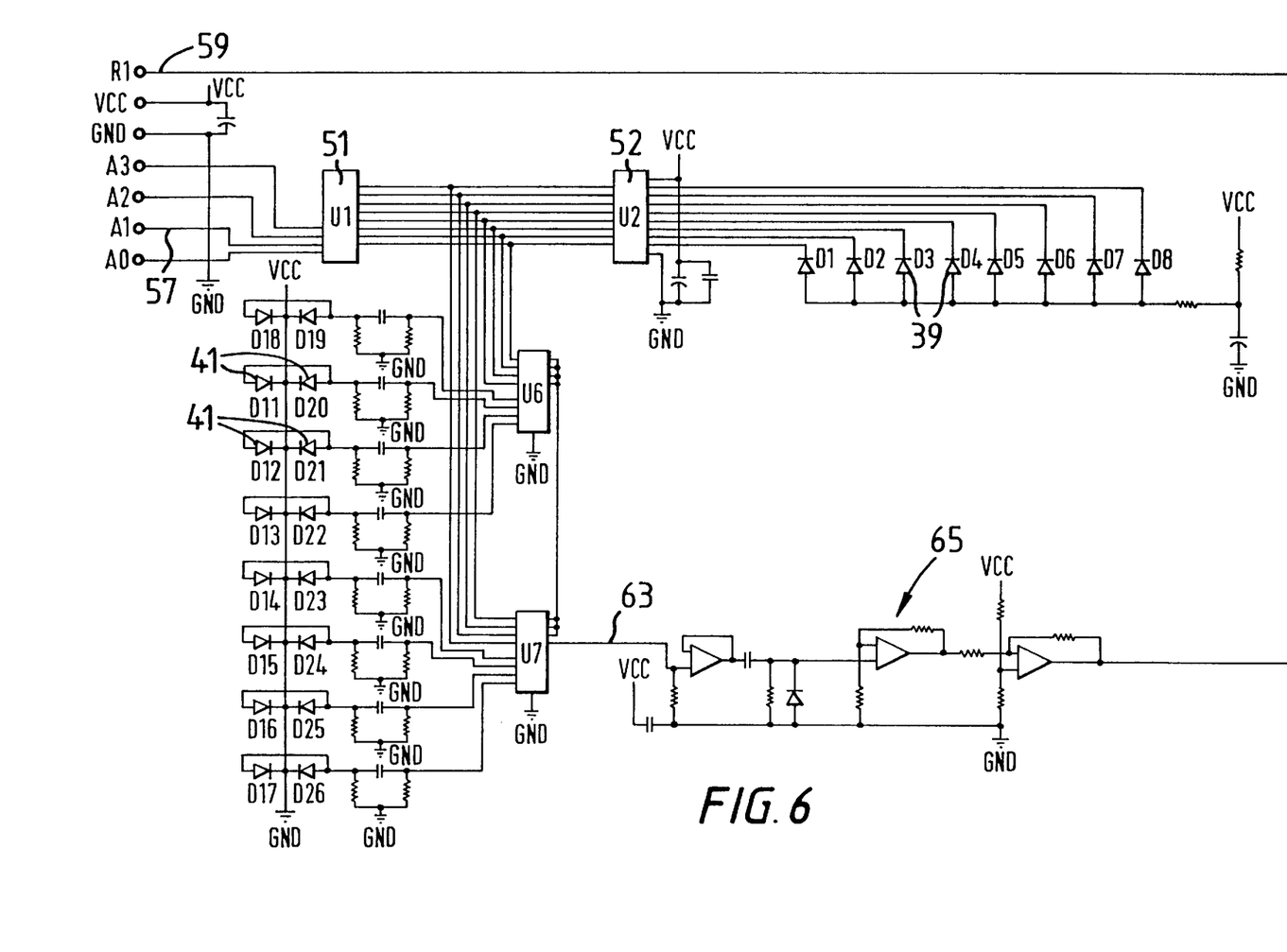
FIG. 6 is a circuit diagram of a shelf unit.

Each shelf is provided with the requisite circuitry for driving the transmitters as shown generally in FIG. 3 and in more detail in FIG. 6. This driving is suitably carried out by a 1 of 8 decoder 51 which triggers the eight transmitters 39 (D1 to D8 in FIG. 6) in succession.

FIG. 3 shows the arrangement of the connections of the seven shelves 23 in the proposed bar. The bar is controller by a bar controller 53, details of which will be described hereafter in connection with FIG. 7. The bar controller 53 has a first line 55 for enabling it to communicate with the central processor 5, eight transmit lines 57 and eight receive lines 59, both of which latter sets of lines are connected to the shelf electronics of the individual shelves. There is provision, notionally, for an eight shelf, as indicated at 61, the connections for the eighth shelf being used for other functions such as lock detection etc.

Each of the first seven transmit lines 57 is connected to the 1 of 8 decoder 51 of the individual shelves. The receivers 41 of the shelf in question are combined together into a single receive line.

Turning now to FIG. 6, which shows details of the shelf electronics, input is provided for the transmit line 57 on A1. Power is supplied via connections VCC and GND and the receive line 59 is connected at R1. The transmit line receives an activation signal which passes to the 1 of 8 decoder 51 (U1) in which it is split into eight sequential signals and passed to transmitter drivers located in the unit 52 (U2) which, in the present instance comprises a Darlington driver IC. The driving output is connected on eight lines to the individual transmitters 39 (D1 to D8).

The receivers 41 (D18 to D26) are also enabled sequentially with the associated transmitter by the 1 of 8 decoder 51. However, it may only be the outputs that are enabled in this way, the receivers themselves being left permanently energised to avoid spurious effects. The outputs of the receiver are transmitted through units U6 and U7 which contain analogue switches, the outputs of these switches U6 and U7 are fed on a single line 63 through an amplifier and comparator circuit 65 to the receive line terminal R1.

Figure 7:
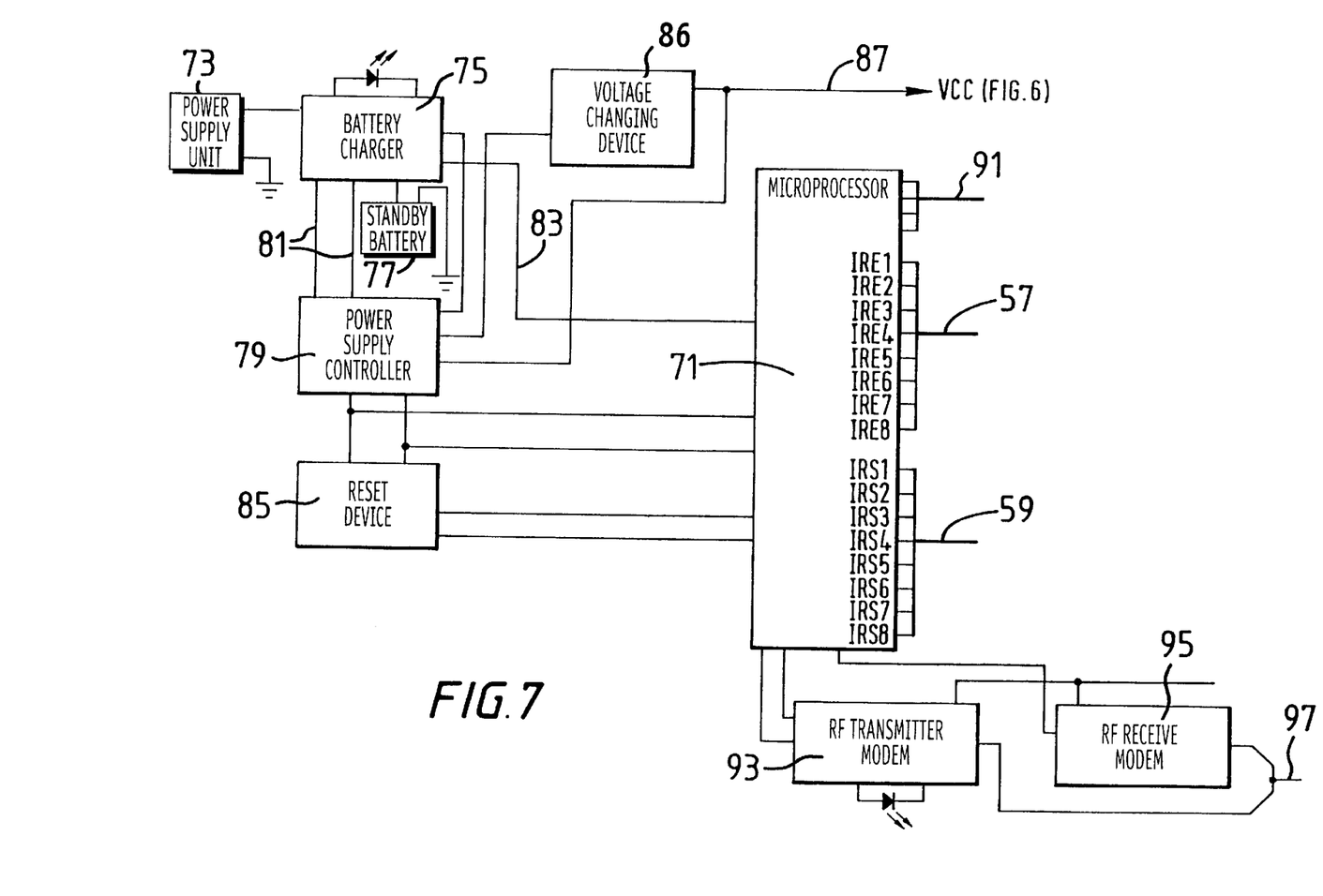
FIG. 7 is a circuit diagram of the bar controller.

FIG. 7 is a block diagram of the bar controller 53 to which each of the shelf units shown in FIG. 6 are connected. The basis of this unit is a microprocessor 71 which provides the control operations. Power supply is by means of a power supply unit 73 which feeds a battery charger 75 for charging a stand-by battery 77. The battery charger output supplies either the mains supply directly from the power supply unit 73 or the stand-by supply from the battery 77 to a power supply controller 79 via lines 81 or directly to the microprocessor 71 via the line 83. The power supply controller also controls a reset device 85 and provides power to a voltage changing device 86 which in turn supplies the lower voltage required for the operation of the shelf units via line 87 (connected to VCC in FIG. 6). The power supply controller also provides information to the microprocessor 71 for transmission to the central processor 5.

The microprocessor 71 has eight transmitter lines IRE1 to IRE8 forming the transmit line 57 and eight receiver lines IRS1 to IRS8 forming the receive line 59. Additional outputs for controlling the bar door lock and refrigeration control are provided on the control line 91.

Communication with the central processor 5 is carried out by way of an RF transmitter modem 93 and an RF receive modem 95 which are together connected to the aerial system by way of a coaxial cable 97.

The operation of the sensing operation is as follows:

The bar controller first activates the first transmit line IRE1 which passes a signal to the 1 of 8 decoder 51 of the first shelf. The 1 of 8 decoder of this shelf, in response to the transmit line signal, fires each of the eight infrared transmitters 39 (D1 to D8) in sequence and the receivers 41 associated with each transmitter 39 will produce a signal or no signal depending on whether there is an article at the appropriate location. The receiver's signals will all be transmitted down the single receive line to the controller. Since, due to the sequential firing of the transmitters, the received signals will be received by the controller at different times, the controller can easily sort out which of the signals relate to which article location. The controller will then store the data in suitable form for despatch to the central processor.

Once the first shelf has been dealt with, the same operation is carried out on the second shelf and so on.

In an alternative arrangement, instead of dealing with each shelf as a whole, the first locations of all shelves are triggered together followed by the second location of all the shelves and so on.

As previously mentioned, the notional eighth shelf will also have its "transmitters" fired to read the other data required, namely door open status and the temperature in the bar. It is to be noted that while such features as door sensors may be operated on the infrared basis, other suitable sensors such as micro switches or temperature sensors may be used.

The central processor 5 will interrogate the bar controllers in sequence, running through the various rooms of the hotel in order. It will process the data received and pass it as required to its ancillary equipment as mentioned earlier. In order to speed up the interrogation process, the bar controllers will issued a simplified signal indicating no change in its situation if no changes have taken place since the previous interrogation.

While the sensors will immediately detect the removal of an article from the shelves, a built in delay may be used before the data is passed to the billing arrangements so as to allow a customer to inspect an article and replace it if not wanted. The length of the delay may be set as circumstances demand.

It will be appreciated that various changes may be made to the above described embodiment without departing from the scope of the invention. For example, all of the shelves of a bar may be activated at once, the controller sorting out the individual shelves by reason of the fact that the received signals are returned on different lines of the receive line.

If it is desired to have more than eight articles on a shelf with less shelves, the extra positions can be sensed by combining the extra positions as a notional further shelf. Thus, for example, with four shelves containing ten locations, locations 9 and 10 of each shelf would form a notional fifth shelf. In this case and where all the shelves are driven simultaneously, each shelf unit could be provide with an extra two sensors having a different receive output. These additional outputs could then be joined together so as to be received by the controller as the "extra shelf".

Although the embodiment described has operated on the basis of eight shelves of seven shelves of eight articles, it will be appreciated that a controller having a microprocessor capable of dealing with more than eight inputs and outputs could be used if more articles and/or shelves are desired.

Additional functions other than those described above could be provided. For example, an override could be provided to cut off the operation temporarily while the bar is being restocked. A mechanical lock could be provide for the bar in addition to the electronically controlled lock to enable the customer to lock the bar to prevent access, for example, by children.

Other possibilities include the use of three or more receivers associated with each transmitter.

Instead of the use of radio frequency transmission, a twisted pair communication cable system could be used.

I claim:

1. A bar control arrangement for an open shelf bar comprising:

a plurality of shelf units;

a plurality of specific locations on each shelf unit, each location being adapted to receive an individual article in the bar;

optical sensing means associated with each said location adapted to directly optically sense the presence or absence of an article at said location;

activating means for each of said shelf units connected to sequentially activate said sensing means; and a controller located in said bar, said controller comprising:

drive means connected to said activating means of each said shelf unit;

receiving means connected to receive signals from said sensing means when activated by said drive means;

processing means receiving signals from said receiving means and processing said signals into suitable form for onward transmission of data; and input and output means, communicating with a central processor, so as to transmit data from said processing means thereto and receive incoming control signals therefrom.

2. An arrangement as claimed in claim 1, wherein said activating means includes circuitry to activate all the individual shelf units at the same time.

3. An arrangement as claimed in claim 2, wherein said activating means is arranged to activate said shelf units continuously by repeating an activation cycle once one cycle of activation has been completed.

4. An arrangement as claimed in claim 1, wherein said activating means includes circuitry to activate individual shelf units sequentially.

5. An arrangement as claimed in claim 4, wherein said activating means is arranged to activate said shelf units continuously by repeating an activation cycle once one cycle of activation has been completed.

6. An arrangement as claimed in claim 1, wherein said controller comprises storage means for retaining data until interrogated.

7. An arrangement as claimed in claim 1, wherein means are provided for sending a simple signal from said controller when there has been no change in the bar status since the last interrogation.

8. A bar control arrangement for an open shelf bar comprising:

a plurality of shelf units, each unit having an upper surface and a plurality of specific locations on said upper surface of each shelf unit;

location means on said upper surface of said shelf units for locating individual articles at said specific locations;

optical sensors located beneath said upper surface, associated with each location and adapted to directly optically sense the presence or absence of an article at said location, said upper surface defining a transparent area at least at positions above said sensors, each of said sensors comprising:

an optical transmitter; and an optical receiver located relative to each other at positions in which rays from said transmitter are reflected from an article, if present at the associated location, back to the receiver;

activating means for each of said shelf units connected to sequentially activate said sensing means; and a controller located in said bar, said controller comprising:

drive means connected to said activating means of each said shelf unit;

receiving means connected to receive signals from said sensing means when activated by said drive means;

processing means receiving signals from said receiving means and processing said signals into suitable form for onward transmission of data; and input and output means communicating with a central processor so as to transmit data from said processing means thereto and receive incoming control signals therefrom.

9. An arrangement as claimed in claim 8, wherein said location means comprise shallow dished portions of said upper surface of said shelf units.

10. An arrangement as clamed in claim 8, wherein two or more said receivers are associated with each transmitter and are located in positions in which at least one of said receivers receives the ray from said transmitter when an article is present at the associated location.

11. An arrangement as claimed in claim 8, wherein said transmitter is an infrared transmitter and said receiver is an infrared receiver.

12. An arrangement as claimed in claim 8, wherein said sensors are mounted on a circuit board located beneath said upper surface of said shelf units.

13. An arrangement as claimed in claim 12, wherein said circuit board incorporates said activating means for activating said transmitters.

14. An arrangement as claimed in claim 13, wherein said drive means has firing means adapted to fire said transmitters in sequence such that signals from said receivers will also be present in the same sequence.

15. An arrangement as claimed in claim 14, wherein said drive means is triggered by a single input line and the outputs of said receivers are combined into a single output line.

16. An open shelf bar arrangement for an hotel or like establishment comprising a plurality of open shelf bars each comprising a plurality of shelf units and having a plurality of specific locations on each shelf unit, each location being adapted to receive an individual article in the bar;

optical sensing means associated with each said location adapted to directly optically sense the presence or absence of an article at said location;

activating means for each of said shelf units connected to sequentially activate said sensing means; and a controller located in said bar, said controller comprising:

drive means connected to said activating means of each said shelf unit;

receiving means connected to receive signals from said sensing means when activated by said drive means;

processing means receiving signals from said receiving means and for processing said signals into suitable form for onward transmission of data; and input and output means to transmit data from said processing means and receive incoming control signals;

a central processor for receiving data from said input and output means of each bar and for transmitting data to said input and output means;

reporting means connected to said central processor for producing reports on the bars' operation; and a central billing arrangement connected to said central processor for adding items taken from individual bars to appropriate customer billing.

17. An arrangement as claimed in claim 16, including a radio frequency channel connecting said central processor with said bar controllers.

18. An arrangement as claimed in claim 17, wherein said radio frequency channel comprises the aerial system of the hotel.

19. An arrangement as claimed in claim 16, including a twisted pair communication cable system connecting said central processor with said bar controllers.

20. An open shelf bar arrangement for an hotel or like establishment comprising:

a plurality of open shelf bars, each comprising a plurality of shelf units having an upper surface on each shelf unit;

a plurality of specific locations on said upper surface of each said shelf unit;

location means on said upper surface of said shelf units for locating individual articles at said specific locations;

optical sensors located beneath said upper surface, associated with each location and adapted to directly optically sense the presence or absence of an article at said location, said upper surface defining a transparent area at least at positions above said sensors, said sensors comprising:
an optical transmitter; and
an optical receiver, located relative to each other at positions in which rays from said transmitter are reflected from an article, if present at the associated location, back to the receiver;
activating means for each of said shelf units connected to sequentially activate said sensing means; and
a controller located in said bar, said controller comprising:
drive means connected to said activating means of each said shelf unit;
receiving means connected to receive signals from said sensing means when activated by said drive means;
processing means receiving signals from said receiving means and processing said signals into suitable form for onward transmission of data; and
input and output means communicating with a central processor so as to transmit data from said processing means thereto and receive incoming control signals therefrom;

a central processor for receiving data from said input and output means of each bar and for transmitting data to said input and output means;

reporting means connected to said central processor for producing reports on the bars' operation; and a central billing arrangement connected to said central processor for adding items taken from individual bars to appropriate customer billing.

21. An arrangement as claimed in claim 20, and comprising a radio frequency channel connecting said central processor with said bar controllers.

22. An arrangement as claimed in claim 21, wherein said radio frequency channel includes at least a portion of an aerial system internal to said hotel or like establishment.

23. An arrangement as claimed in claim 20, comprising and further including a twisted pair communication cable system connecting said central processor with said bar controllers.

* * * * *